United States Patent [19]

Doto

[11] Patent Number: 4,624,506
[45] Date of Patent: Nov. 25, 1986

[54] COMPOUND ELECTROPNEUMATIC BRAKE CONTROL SYSTEM

[75] Inventor: Shigeaki Doto, Kobe, Japan

[73] Assignee: Nippon Air Brake Co., Ltd., Kobe, Japan

[21] Appl. No.: 748,782

[22] Filed: Jun. 26, 1985

[30] Foreign Application Priority Data

Jun. 28, 1984 [JP] Japan ................... 59-134400

[51] Int. Cl.$^4$ ............................................. B60T 13/68
[52] U.S. Cl. ............................................ 303/3; 303/15; 303/22 R; 303/20
[58] Field of Search .................. 303/15, 3, 22 R, 20, 303/195, 7, 8, 22 A, 23 R, 23 A

[56] References Cited

U.S. PATENT DOCUMENTS 3,868,150 2/1975 Maskery ........................... 303/20
3,920,285 11/1975 Maskery ........................ 303/22 R

FOREIGN PATENT DOCUMENTS 32-172181 9/1957 Japan .
33-93176 5/1958 Japan .
0144750 11/1980 Japan ................................. 303/3

Primary Examiner—Bruce H. Stoner, Jr.
Assistant Examiner—Alvin Oberley
Attorney, Agent, or Firm—J. B. Sotak

[57] ABSTRACT

A compound electropneumatic brake control system which has a compound brake power command controller for controlling an electric brake system and a fluid brake system on motor cars and trailer cars. A plurality of motor and trailer car weight setters and a plurality of signal summing networks which cause any brake deficiency is either supplemented by both the fluid brake systems on the motor cars and trailer cars or is initially supplemented by the fluid brake system on the trailer cars and then is subsequently supplemented by the fluid brake system on the motor cars.

6 Claims, 7 Drawing Figures

COMPOUND ELECTROPNEUMATIC BRAKE CONTROL SYSTEM

FIELD OF THE INVENTION

This invention relates to a compound electropneumatic brake control system for a train having powered motor cars and nonpowered trailer cars. When the electric brake power is not enough for the compound brake power, the difference is supplemented with the fluid brake power of motor cars and trailer cars. This invention pertains particularly to how to allot the supplemental command signal into each fluid brake system of the motor cars and trailer cars when the deficit brake power must be supplemented by the fluid brake power of each motor car and trailer car.

BACKGROUND OF THE INVENTION

Previously, two types of brake control arrangements were shown and described in Japanese Patent Application Nos. 57-172181 and 58-93176. From now on, the two arrangements will be referred to as the first brake control arrangement and a second brake control arrangement. These two ordinary brake control arrangements are depicted in FIGS. 2 through 7. Referring now to FIG. 2, there is shown an electropneumatic braking system which may be defined as the first control method. The powered motor car (M car) and nonpowered trailer car (T car) are each equipped with a fluid brake system $17m$, $17t$, respectively, each of which consists of an electricfluid pressure change valve EP, a relay valve RV, and a brake cylinder BC. A compound brake power command signal F is produced by a compound brake power command signal controller 2 which may be referred to as a command controller. The command signal F is transferred to the electric brake power command controller 3, the positive input of a first-second operator of summing network $72a$, and the T car setter 9 which is set by a suitable weight-response device carried by the T car. The electric brake power command controller 3 has limited capacity. In other words, when the compound brake power command signal F is less than the maximum adhesion brake power equivalent signal H, the electric brake power command signal E, which is the output of the electric brake power command 3, is equal to the compound brake power command signal F, (E=F). When the compound brake command signal F is greater than the maximum adhesion brake power equivalent signal H, the electric brake power command signal E is equal to the maximum adhesion brake power equivalent signal H, (E=H). Depending on this electric brake power command signal E, the electric brake system 4, such as, regenerative or dynamic, is rendered functional so that the elecelectric brake power equivalent signal G which is required for the real electric brake power is transferred to the negative input of a first operator 71. The first operator or summing network 71 subtracts the electric brake power equivalent signal G from the electric brake power command signal E and transfers the result (E−G) to the T car setter $6t$ as well as to the M car setter $6m$. The T car setter $6t$ produces an output which is $(E-G).T/(M+T)$. This T car allocation is conveyed to the positive input of the second operator $72b$. The M car setter $6m$ produces an output which is $(E-G).M/(M+T)$. This M car allocation is conveyed to the positive input of the fifth operator 75. Here, M stands for the weight of the M car (motor car) and T stands for the weight of the T car (trailer car) where generally (M>T).

It will be appreciated that the first-second operator $72a$ subtracts the electric brake power command signal E from the compound brake power command signal F and transfers the result (F−E) to the positive input of the second-second operator $72b$. The second-second operator $72b$ adds the two inputs (F−E) and $(E-G).T/(M+T)$ and transfers the result $(F-E)+(E-G).T/(M+T)$ to the positive input of the third summing operator 73 and to the positive input of the fourth operator 74. The third operator 73 subtracts the output of the T car setter, namely $F.T/(M+T)$, from the input $(F-E)+(E-G).T/(M+T)$ and transfers the result $(F-E)+(E-G).T/(M+T)-F.T/(M+T)$ to a diode 76. The diode 76 transfers the output of the third operator 73 to the negative input of the fourth operator 74 and to the positive input of the fifth operator 75 when the output of the third operator 73 is positive. When the output of the third operator 73 is less than 0, it conveys a 0 to the fourth and fifth operators. The fourth operator 74 subtracts the output of diode 76 from the output of the second operator 72, and transfers the result as a fluid brake power command signal to the T car fluid brake system $17t$ via the T car amplifier $10t$. The fifth operator 75 adds the output of the M car setter $6m$, namely $(E-G).M/(M+T)$, and the output of diode 76 and then transfers the result as the fluid brake power command signal to the M car fluid brake system $17m$ via the M car amplifier $10m$. The above-described T car fluid brake power command signal and M car fluid brake power command signal can be considered to be the fluid brake power of the T car and the M car.

Also, the above-described electric brake power equivalent signal G can be considered to be the electric brake power, and the synthesized brake power of the M car is the sum of the fluid brake power and the electric brake power of the M car. Therefore, the following can be assumed:

(I)

When F<H then,

T car fluid brake power $=(F-G).T/(M+T)$
M car fluid brake power $=(-G).M/(M+T)$
M car synthesized brake power $=(F-G).M/(M+T)+G$ (II)

When F≧H then, (a)

T car fluid brake power $=(H-G).T/(M+T)+(F-H)$
M car fluid brake power $=(H-G).M/(M+T)$
M car synthesized brake power $=(H-G).M/(M+T)+G$ (b)

When B−(F−H).M/T then,

T car fluid brake power $=F.T/(M+T)$
M car fluid brake power $=F.M/(M+T)-G$
M car synthesized brake power $=F.M/(M+T)$ The deceleration rate is the brake power divided by the weight. Therefore, the fluid brake deceleration rate of the T car, namely Bt; and the fluid brake deceleration rate of the M car, namely Bm; and the synthesized deceleration rate of the M car, namely BM; are as follows:

(I)

When F<H then, $Bt=Bm=(F-G)/(M+T)$
$BM=(F-G)/(M+T)=G/M$ (II)
When $F \geq H$ and
(a)
When $G \geq (F-H) \cdot M/T$ then,
$Bt = (H-G)/(M+T) + (F-H)/T$
$Bm = (H-G)/(M+T)$
$BM = (H-G)/(M+T) + G/M$
(b)
When $G < (F-H) \cdot M/T$ then,
$Bt = F/(M+T)$
$Bm = F/(M+T) - G/M$
$BM = F/(M+T)$ The relationship between these deceleration rates Bt, Bm, BM and the electric brake ratio (G/E) is shown in FIG. 3 and FIG. 4. It will be seen that FIG. 3 shows the case in which (F<H), in other words, the compound brake power command signal F is less than the maximum adhesion brake power equivalent signal H. The fluid brake deceleration rate Bm of the M car and the fluid brake deceleration rate Bt of the T car increases from 0 to F/(M+T) with a decrease in the electric brake ratio from 100%. The synthesized deceleration rate BM of the M car decreases from (F/M) to (F/(M+T)) with a decrease in the electric brake ratio from 100%. It will be seen that FIG. 4 shows the case in which (F≧H), in other words, the compound brake power command signal F is larger than the maximum adhesion brake power equivalent signal H. The fluid brake deceleration rate Bt of the T car is (F−H)/T when the electric brake ratio is 100%, and Bt increases with a decrease in the electric brake ratio. In the area where G<(F−H).M/T, Bt is constant, and it is equal to F/(M+T). The fluid brake deceleration rate Bm of the M car increases from 0 with a decrease in the electric brake ratio from 100%, and the increase is larger in the area where G<(F−H).M/T than in the area where G≧(F−H).M/T, and it reaches F/(M+T) when the electric brake ratio is 0%.

The synthesized deceleration rate BM of the M car is (H/M) when the electric brake ratio is 100%, and decreases with a decrease in the electric brake ratio, and it is constant F/(M+T) in the area where G<(F−H).M/T.

Referring now to FIG. 5, there is shown another system which uses a second brake control method. The parts which are the same as in FIG. 2 are numbered by the same reference characters and a detailed explanation has been omitted for the sake of convenience.

The compound brake power command signal command controller 2, electric brake power command controller 3, electric brake system 4, T car amplifier 10t, M car amplifier 10m, T car fluid brake system 17t, and the M car fluid brake system 17m are all the same as those described in FIG. 2. The T car setter 6t conveys F.T/(M.T), which is the fraction of the compound brake power command signal F that is allocated to the T car to the positive input of a first operator 81.

The M car setter 6m conveys F.M/(M.T), which is the fraction of the compound brake power command signal F that is allocated to the M car to the negative input of a second operator 82 and to the positive input of a third operator 83. The second operator 82 subtracts F.M/(M+T), which is the output of the M car setter 6m that was transferred into the positive input of the second operator 82 and it then transfers the results G−F.M/(M+T) to a first diode 84.

The first diode 84 outputs this unchanged when the output of the second operator 82 is positive. When the output of the second operator 82 is less than 0, it outputs 0 and transfers it to the negative input of the first operator 81.

The first operator 81 subtracts the output of the first diode 84 from F.T/(M+T), which is the output of the T car setter 6t and transfers the result to the T car fluid brake system 17t as the fluid brake power command signal of the T car via the T car amplifier 10t.

The third operator 83 subtracts the electric brake power equivalent signal G, which is transferred into the negative input of the third operator from F.M/(M+T) which is the output of the M car setter 6m, and it is transferred into the positive input of the third operator 83, and the result F.M/(M+T) is transferred to the second diode 85.

The second diode 85 outputs the signal unchanged when the output of the third operator 83 is positive. When the output of the third operator 83 is less than 0, it outputs 0 and transfers it to the M car fluid brake system 17m as the fluid brake power command signal of the M car via the M car amplifier 10m. Just like the first-known method, the fluid brake power of the T car, the fluid brake power of the M car, and the synthesized brake power of the M car are designed as follows:

(I)
When $G > F.M/(M+T)$ then,
T car fluid brake power $= (F-G)$
M car fluid brake power $= 0$
M car synthesized brake power $= G$ (II)
When $G \leq F.M/(M+T)$ then,
T car fluid brake power $= F.M/(M+T)$
M car fluid brake power $= F.M/(M+T) - G$
M car synthesized brake power $= F.M/(M+T)$ Then, the fluid brake deceleration rate Bt of the T car, the fluid brake deceleration rate Bm of the M car, and the synthesized deceleration rate BM of the M car are as follows:

(I)
When $G > F.M/(M+T)$ then,
$Bt = (F-G)/T$
$Bm = 0$
$BM = G/M$ (II)
When $G \leq F.M/(M+T)$ then,
$Bt = F/(M+T)$
$Bm = F/(M+T) - G/M$
$BM = F/(M+T)$ The relationships between the deceleration rate Bt, Bm, BM and the electric brake ratio (G/E) are shown in FIGS. 6 and 7. It will be appreciated that FIG. 6 shows the case where (F<H), in other words, when the compound brake power command signal F is less than the maximum adhesion brake power equivalent signal H. The fluid brake deceleration rate Bt of the T car is 0 when the electric brake ratio is 100%, and it rises with a decrease in the electric brake ratio. It is constant F/(M+T) in the area where G≦F.M/(M+T). The fluid brake deceleration rate Bm of the M car is 0, while the electric brake ratio ranges from 100% to the point where G=F.M/(M+T). When G≦F.M/(M+T), M rises with a decrease in the electric brake ratio and it becomes F/(M+T) when the electric brake ratio is 0%. The synthesized deceleration rate BM of the M car is (F.M) when the electric brake ratio is 100%, and it falls with a decrease in the electric brake ratio. It becomes F/(M+T) when G≦F.M/(M+T). It will be seen that FIG. 7 shows the case when (F≧H), in other words, when the compound brake power command signal F is larger than the maximum adhesion brake power equivalent signal H. The fluid brake deceleration rate Bt of the T car is F−H/T when the electric brake ratio is 100%, and it rises with a decrease in the electric brake ratio. It becomes constant F/(M+T) when G≧F.M/(M+T). The fluid brake deceleration rate Bm of the M car is 0 in the area where the electric brake ratio is from 100% to G=F.M/(M+T). In the area where G≧F.M/(M+T) it rises with a decrease in the electric brake ratio, and it becomes F/(M+T) when the electric brake ratio is 0%. The synthesized deceleration rate BM of the M car is (H/M) when the electric brake ratio is 100%, and it falls with a decrease in the electric brake ratio, and it becomes constant F/(M+T) in the area where G≧F.M/(M+T).

OBJECTS AND SUMMARY OF THE INVENTION

Accordingly, it is an object of this invention to provide a new and improved compound electropneumatic brake control system for a train having powered motor cars and nonpowered trailer cars.

Another object of this invention is to provide a unique brake control system which is adapted to supplement the deficiency in the electric brake power with fluid brake power of the M car and the T car when the compound brake power command signal is less than the maximum adhesion brake power equivalent signal, and to supplement the deficiency in the electric brake power in the T car prior to the M car when the compound brake power command signal is larger than the maximum adhesion brake power equivalent signal.

In accordance with the present invention, there is provided a compound electropneumatic control system for a train having powered motor M cars and nonpowered trailer T cars comprising, a compound brake power command controller for conveying a compound brake power command signal to an electric brake command controller and to a first-second summing operator, the electric brake command controller conveys an electric brake command signal to an electric brake system, to a first summing operator, and to the first-second summing operator, the electric brake system conveys an electric brake power equivalent signal to the first summing operator, the first summing operator is coupled to an M car weight setter and to a T car weight setter, the M car weight setter is connectable by a first switch to a third-second summing operator and is connectable by a second switch to a fourth summing operator, a second-second summing operator is coupled to the third-second summing operator, the third-second summing operator is coupled to a third and a fifth summing operator, the third summing operator is coupled to the fourth and the fifth summing operator, the fourth summing operator is coupled to an M car fluid brake system, and the fifth summing operator is coupled to a T car fluid brake system wherein any deficiency in the electric brake system is supplemented by the M car and T car fluid brake system when the compound brake power command signal is less than the maximum adhesion brake power equivalent signal, and to supplement the deficiency in the T car fluid brake system prior to the M car fluid brake system when the compound brake power command signal is greater than the maximum adhesion brake power equivalent signal.

BRIEF DESCRIPTION OF THE DRAWINGS

The above objects and other attendant features and advantage of this invention will become more readily apparent from the following detailed description when considered in conjunction with the accompanying drawings, wherein.

DETAILED DESCRIPTION OF THE INVENTION

Figure 1:
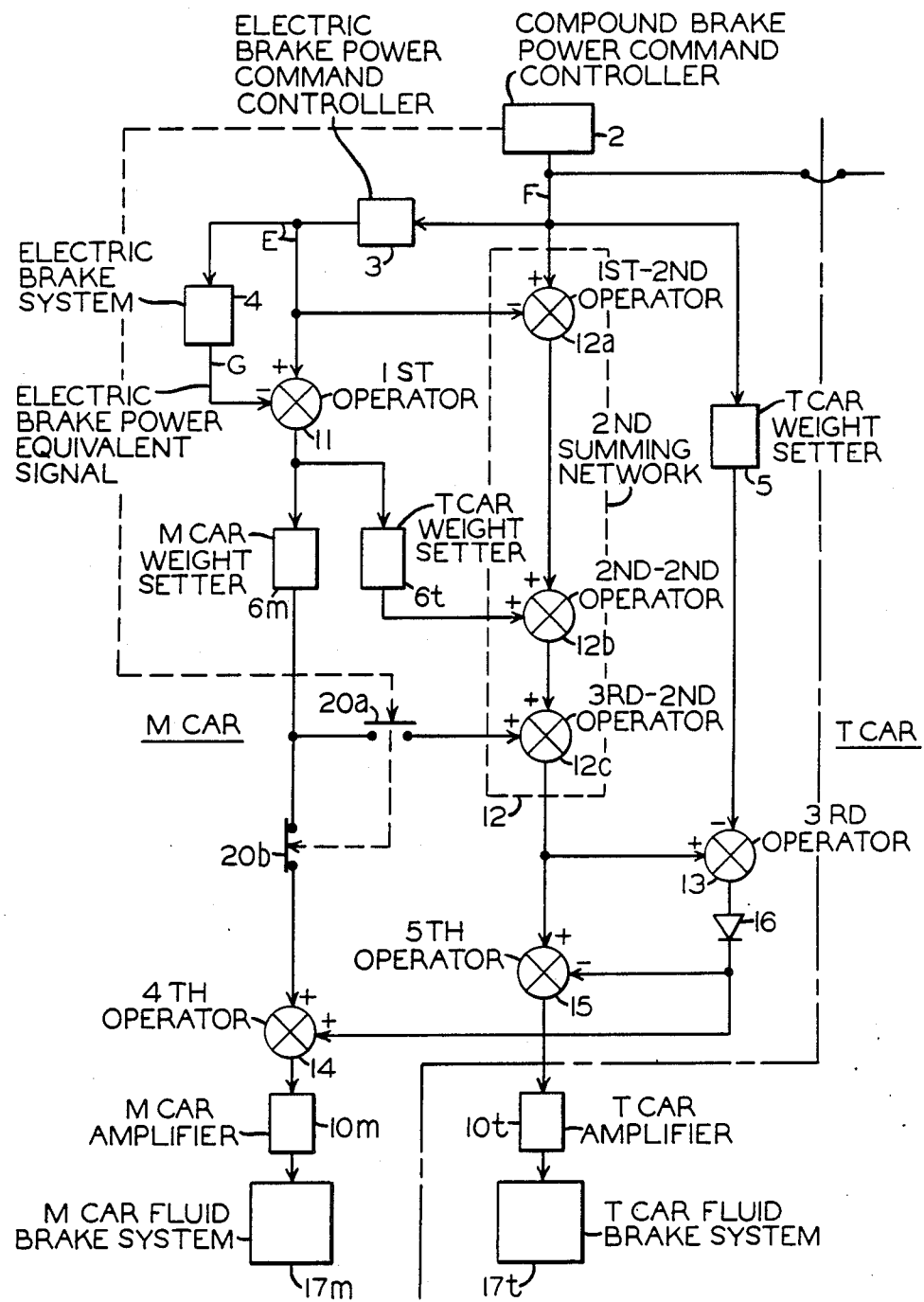
FIG. 1 shows an actual embodiment of a compound electropneumatic brake control system which uses the brake controlling method in accordance with the present invention.

The following terms and reference characters will be used in describing the structure and operation of the compound electropneumatic brake control system of FIG. 1:

F—compound brake power command signal,
E—electric brake power command signal,
G—electric brake power equivalent signal,
H—maximum adhesion brake power equivalent signal of the Motor car,
2—compound brake power command
3—electric brake power command,
4—electric brake system,
6m—M car setter,
6t—T car setter,
10m—M car amplifier,
10t—T car amplifier,
17m—fluid brake system of the M car,
17t—fluid brake system of the T car,
M—M car weight (Motor car weight)
T—T car weight (Trailer car weight)

Further, as described above, the first-known braking method and the second-known braking method have certain problems and shortcomings. Previously, only chopper-controlled trains which use direct-current motors existed, but recently inverter-controlled trains which use induction motors are being developed. If the wheel of the M car slides while braking, the inverter-controlled train detects it and the induction motor decreases its torque immediately so that the electric brake power is lessened. Therefore, compared with the chopper-controlled train, the maximum adhesion brake power of the M car is set higher and the maximum adhesion brake power equivalent signal H in its control system is set high. Under such conditions, let's compare the first braking method with the second braking method for the case in which the compound brake power command signal F is larger than the maximum adhesion brake power equivalent signal H and the electric brake ratio is falling from 100% to some constant value.

Figure 4:
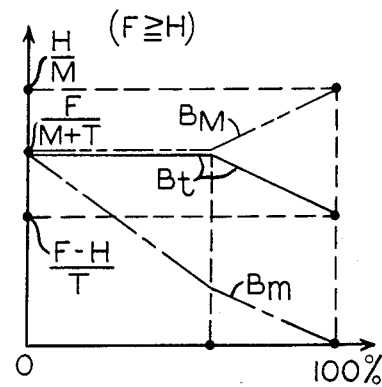
Figure 6:
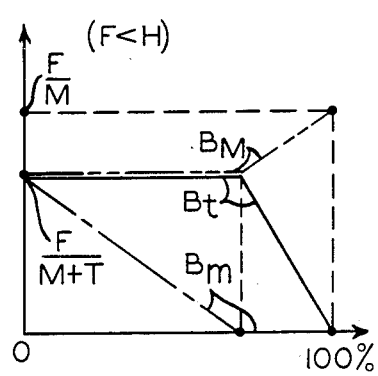
FIGS. 6 and 7 show the relationship between the electric brake ratio and the deceleration rate of the system of FIG. 5.

In the first-known braking method, the deficiency of the electric brake power which accompanies a decrease in the electric brake ratio is supplemented with fluid brake power of the M car and the T car, and the change ratio of the synthesized deceleration rate BM of the M car to the electric brake ratio is the slope of BM in FIG. 4 and it is $T/(M+T)$.

Compared with that, in the second-known braking method, it will be seen that the deficiency of the electric brake power which accompanies a decrease in the electric brake ratio is supplemented with only the fluid brake power of the T car. At this time, the change ratio of the synthesized deceleration rate BM of the M car to the electric brake ratio is the slope of BM in FIG. 7 and it is equal to 1. Therefore, when the compound brake power command signal F is larger than the maximum adhesion brake power equivalent signal H and the electric brake ratio is decreasing from 100%, the decrease in the synthesized deceleration rate BM of the M car is slower in the first-known method than in the second-known method, and it continues longer near the maximum value (H/M) state.

As described already, in the control system of an inverter train, the maximum adhesion brake power equivalent signal H is set high. Therefore, when M is near the maximum value (H/M), the wheel is in the state where it starts to slide easily, and this state continues longer in the first-known method than in the second-known method.

In the second-known method, when the electric brake ratio is less than a certain value, the deficiency of the electric brake power is supplemented with the fluid brake power of the M car and the T car. But, in the area where the electric brake ratio is from 100% to some certain value, the deficiency is supplemented with fluid brake power of the T car only. Therefore, the brake shoe of the T car wears out faster than the one in the M car, so that the cycle of changing brake shoes is not constant, and this causes maintenance difficulty.

Therefore, the subject of this invention is to supplement the deficiency in the electric brake power with fluid brake power of the M car and the T car, when the compound brake power command signal is less than the maximum adhesion brake power equivalent signal, and to supplement the deficiency in the electric brake power in the T car prior to the M car when the compound brake power command signal is larger than the maximum adhesion brake power equivalent signal.

When the compound brake power command signal is less than the maximum adhesion brake power equivalent signal, the difference between the compound brake power command signal and the electric brake power equivalent signal x (T car weight)/(M car weight+T car weight) establishes the fluid brake power command signal of the T car.

At the same time, the difference between the compound brake power command signal and the electric brake power equivalent signal x (M car weight)/(M car weight+T car weight) establishes the fluid brake power command signal of the M car. When the compound brake power command signal is larger than the maximum adhesion brake power equivalent command signal and also the compound brake power command signal x $M/(M+T)$ is less than the electric brake power equivalent signal, the difference between the compound brake power command signal and the electric brake power equivalent signal is set as the fluid brake power command signal of the T car, and the fluid brake power command signal of the M car was set at 0.

When the compound brake power command signal x $M/(M+T)$ is larger than the electric brake power equivalent signal, the compound brake power command signal x $T/(M+T)$ is set at the fluid brake power command signal of the T car, and the difference between the compound brake power command signal x $M/(M+T)$ and the electric brake power equivalent signal is set at the fluid brake power command signal of the M car.

Figure 2:
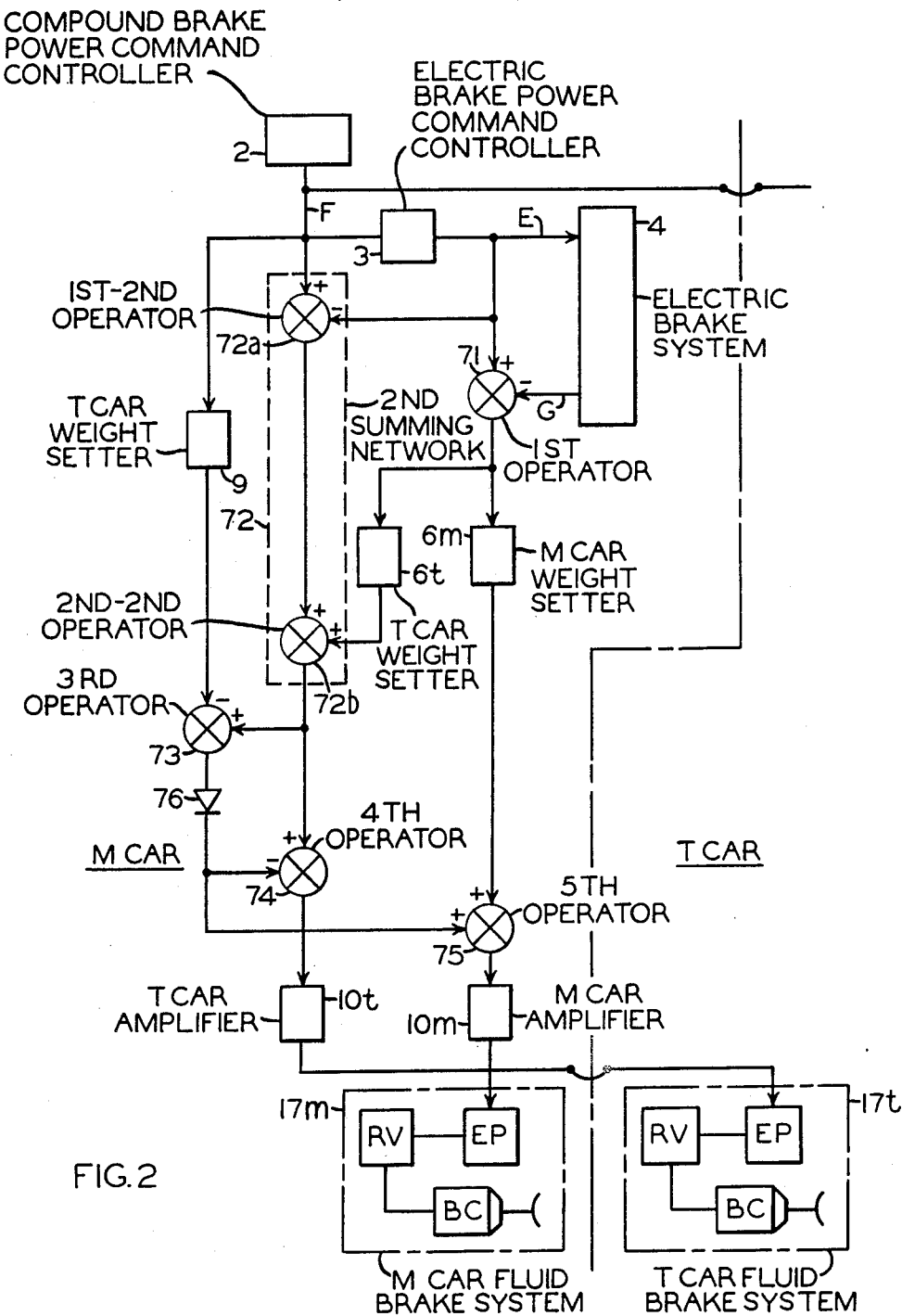
FIG. 2 shows the system which uses a first-known brake control method which is shown in the Japanese patent application No. 57-172181.
Figure 5:
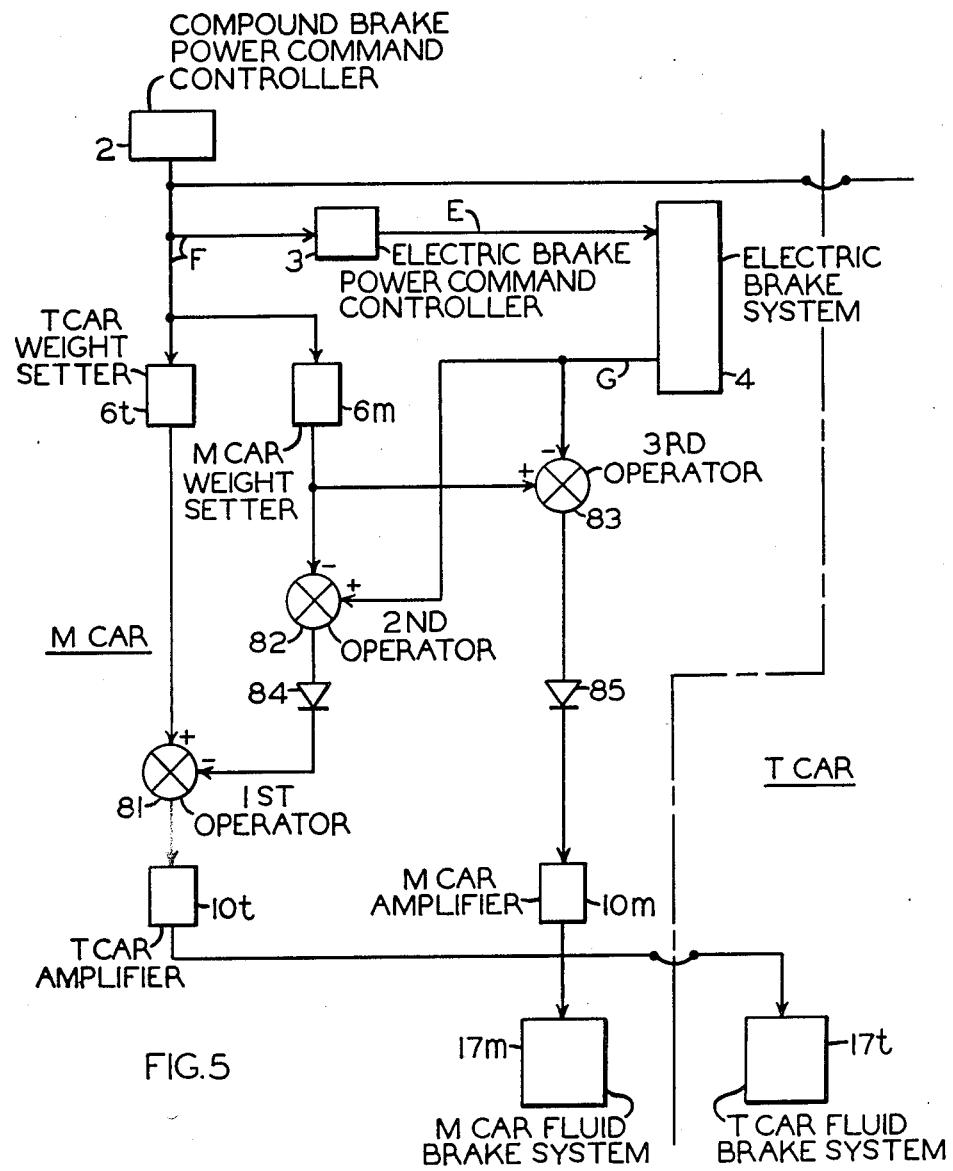
FIG. 5 shows the system which uses a second-known brake control method which is shown in Japanese patent application No. 58-93176.

The following is an explanation of the present invention with reference to FIG. 1. As shown, FIG. 1 illustrates one embodiment of a compound electropneumatic brake control system in accordance with the present invention. The compound brake power command controller 2, electric brake command controller 3, electric brake system 4, T car amplifier 10t, M car amplifier 10m, fluid brake system of the T car 17t, and the fluid brake system of the M car 17m are all the same types of components as were described in the systems of FIGS. 2 and 5. They are characterized with the same references and their structure and operation have been omitted. The first explanation is when (F<H), in other words, the compound brake power command signal F is less than the maximum adhesion brake power equivalent signal H. In this case, the second switch 20b is closed and the first switch 20a is opened by the brake power command controller 2 (as shown in FIG. 1) by the arrowed dashed lines. The first operator 11 subtracts the electric brake power equivalent signal G which is fed back to its negative input from the electric brake power command signal E which is applied to its positive input and then transfers the result (E−G) to the M car setter 6m and the T car setter 6t, both of which are controlled by a suitable weight or load-sensing device. The M car setter 6m transfers $(E-G).M/(M+T)$ which is the fraction of the output of the first summing operator 11, which is (E−G) that is allocated to the M car to the positive input of the fourth operator 14.

It will be seen that a summing network 12 includes a plurality of second operators or summing stages 12a, 12b and 12c. The T car weight setter 6t transfers the fraction of the output of the first operator 11 that is allocated to the T car, which is $(E-G).T/(M+T)$ to the positive input of the second-second operator 12b. The first-second operator 12a subtracts the electric brake power command signal E which is the negative input from the compound brake power command signal F which is fed to the positive input, and outputs the result (F−E).

Since (F<H), (F=E), the output of the first-second summing operator 12a is 0. The second-second summing operator 12b transfers the output of the T car setter 6t, which is $(E-G).T/(M+T)$, to the positive input of the third-second summing operator 12c because the second-second operator 12a outputs a 0. The third-second operator 12c outputs $(E-G).T/(M+T)$, which is the output of the second-second summing operator 12b unchanged, and transfers it to the positive input of the third operator 13 and to the positive input of the fifth operator 15. The third operator 13 subtracts $F.T/(M+T)$ which is the input to the negative terminal and which is the output of the T car setter 5 from $(E-G).T/(M+T)$ which is the positive input and transfers the result $(-G).T/(M+T)$ to diode 16. Diode 16 outputs a 0 since the output of the third operator 13, which is $(-G).T/(M+T)$, is always less than 0. Since the output of diode 16 is 0, the fourth operator 14 outputs $(E<G).M/(M+T)$ and transfers it as the fluid brake power command signal of the M car to the fluid brake system of the M car 17m via the M car amplifier 10m.

Since the output of diode 16 is a 0, the fifth operator 15 outputs $(E-G).T/(M+T)$ and transfers it to the fluid brake system of the T car 17t as the fluid brake power command signal via the T car amplifier 10t.

Next, the case when the compound brake power command signal F is larger than the maximum adhesion brake power equivalent signal H, namely ($F \geq H$), will be explained. At this time, the first switch 20a is closed and at the same time the second switch 20b is opened. The first operator 11, M car setter 6m, and T car setter 6t are the same as in the case when ($F < H$).

The first-second summing operator 12a subtracts the electric brake power command signal E which is input to its negative terminal from the compound brake power command signal F which is input to its positive terminal and outputs the result $(F-E)$. The second-second operator 12b adds the output of the T car setter 6t $(E-G).T/(M+T)$ and the output of the second operator 12a $(F-E)$ and transfers the result $(F-E)+(E-G).T/(M+T)$ to the positive input of the second-second summing operator 12c. The second operator 12c adds the output of second operator 12b $(F-E)+(E-G).T/(M+T)$ and the output of the M car setter 6m $(E-G).M/(M+T)$ and transfers the result $(F-G)$ to the positive input of the third operator 13 and to the positive input of the fifth operator 15.

The third summing operator 13 subtracts the output of the T car setter 5 $(F.T)/(M+T)$ which is the input to its negative terminal from $(F-G)$ which is the input to its positive terminal and transfers the result $F.M/(M+T)-G$ to the diode 16.

The diode 16 outputs it unchanged when the output of the third operator 13 is positive. When the output of the operator 13 is less than 0, it outputs a 0 and transfers it to the positive input of the fourth operator 14 and to the negative input of the fifth summing operator 15. The fourth summing operator 14 transfers the output of the diode 16 unchanged to the fluid brake system of the M car 17m as the M car fluid brake command signal via the M car amplifier 10m.

Figure 3:
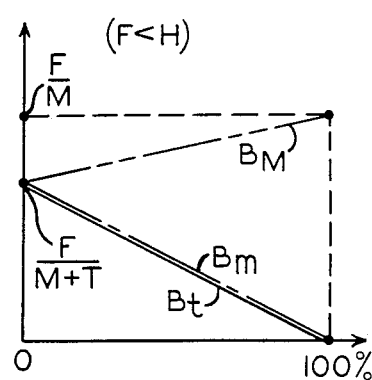
FIGS. 3 and 4 show the relationship between the electric brake ratio and the deceleration rate of the system of FIG. 2.
Figure 7:
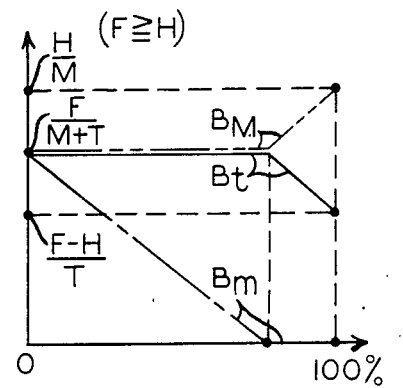

Based on the above, the fluid brake power of the T car, fluid brake power of the M car, and synthesized brake power of the M car are as follows:

(I)
When $F<H$ (at this time $E=F$) then,
T car fluid brake power $=(E-G).T/(M+T)$
M car fluid brake power $=(E-G).M/(M+T)$
M car synthesized brake power $= (E-G)M/(M+T)+G$ (II)
When $F \geq H$ then,
(a)
$G>F.M/(M+T)$
T car fluid brake power $=F-G$
M car fluid brake power $=0$
M car synthesized brake power $=G$ (b)
$G \geq F.M/(M+T)$
T car fluid brake power $=F.T/(M+T)$
M car fluid brake power $=F.M/(M+T)-G$
M car synthesized brake power $=F.M/(M+T)$ Then, depending on these results, the fluid brake deceleration rate Bt of the T car, fluid brake deceleration rate BM of the M car, and synthesized deceleration rate BM of the M car can be assumed as follows:

(I)
When $F<H$ then,
$Bt=m=(E-G)/(M+T)$
$BM=(E-G)/(-T)+G/M$ (II)
When $F \geq H$ then,
(a)
$G<F.M/(M+T)$
$Bt=(F-G)/T$
$Bm=0$
$BM=G/M$ (b)
$G \geq F.M/(M+T)$
$Bt=F/(M+T)$
$Bt=F/(M+T)$
$Bm=F/(M+T)-G/M$
$BM=F/(M+T)$ The relationship between Bt, Bm, BM and the electric brake ratio (G/E) is shown in FIGS. 3 and 7. FIG. 3 shows the case where the compound brake power command signal F is less than the maximum adhesion brake power equivalent signal H, namely ($F<H$). FIG. 7 shows the case when $F \geq H$.

Since FIGS. 3 and 7 were explained already in the previous known technique section, their explanation is omitted here.

In analyzing the operation of the subject brake controlling method, it will be seen that when the brake command is low, in other words, when the compound brake power command signal F is less than the maximum adhesion brake power equivalent signal H and when the electric brake ratio falls from 100%, any braking deficiency is supplemented by weight-distributed fluid brake power of the M car and the T car. Therefore, it is possible to make the fluid brake deceleration rate for the M car and the T car equal. Therefore, in the lower brake commanding time, which is the normal the brake shoes of the M car and the T car wear out at the same rate and hence maintenance becomes simplified. In the case where the brake command is high, in other words, the compound brake power command signal F is larger than the maximum adhesion brake power equivalent signal H and when the electric brake ratio drops from 100% to a certain constant value, any braking deficiency is supplemented with only the T car fluid brake power. Therefore, the synthesized brake power of the M car is the value of only the electric brake power. In viewing FIG. 4, in which the synthesized brake power is the sum of the electric brake power and the fluid brake power, the synthesized brake power decreases faster since the M car fluid brake does not supplement so that the wheels can adhere to the rail in the early stage even if sliding starts. Therefore, the localized wearing or flat spots on the wheels can be prevented and/or reduced.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above specifically described embodiment of the invention may be made by those skilled in the art without departing from the spirit and scope of the invention as set forth in the appended claims.

Having thus described the invention, what I claim as new and desire to secure by Letters Patent, is:

1. A compound electropneumatic brake control system for a train having powered motor M cars and nonpowered trailer T cars comprising, a compound brake power command controller for conveying a compound brake power command signal to an electric brake command controller and to a first-second summing operator, said electric brake command controller conveys an electric brake command signal to an electric brake system, to a first summing operator, and to said first-second summing operator, said electric brake system conveys an electric brake power equivalent signal to said first summing operator, said first summing operator is coupled to an M car weight setter and to a T car weight setter, said M car weight setter is connectable by a first switch to a third-summing operator and is connectable by a second switch to a fourth summing operator, a second-second summing operator is coupled to said third-second summing operator, said third-second summing operator is coupled to a third and a fifth summing operator, said compound brake power command signal is conveyed to another T car weight setter which is coupled to said third summing operator, said third summing operator is coupled to said fourth and said fifth summing operator, said fourth summing operator is coupled to an M car fluid brake system, and said fifth summing operator is coupled to a T car fluid brake system wherein any deficiency in the electric brake system is supplemented by said M car and T car fluid brake system when said compound brake power command signal is less than the maximum adhesion brake power equivalent signal and to supplement the deficiency in said T car fluid brake system prior to said M car fluid brake system when said compound brake power command signal is greater than the maximum adhesion brake power equivalent signal.

2. The compound electropneumatic brake control system for a train having a powered motor M car and a nonpowered trailer T car, as defined in claim 1, wherein a diode couples said third summing operator to said fourth and said fifth summing operator.

3. The compound electropneumatic brake control system for a train having a powered motor M car and a nonpowered trailer T car, as defined in claim 1, wherein an amplifier couples said fourth summing operator to said M car fluid brake system.

4. The compound electropneumatic brake control system for a train having a powered motor M car and a nonpowered trailer T car, as defined in claim 1, wherein an amplifier couples said fifth summing operator to said T car fluid brake system.

5. The compound electropneumatic brake control system for a train having a powered motor M car and a nonpowered trailer T car, as defined in claim 1, wherein said first switch is opened and said second switch is closed when said compound brake power command signal is less than said maximum adhesion brake power equivalent signal.

6. The compound electropneumatic brake control system for a train having a powered motor M car and a nonpowered trailer T car, as defined in claim 1, wherein said first switch is closed and said second switch is opened when said compound brake power command signal is greater than said maximum adhesion brake power equivalent signal.

* * * * *

UNITED STATES PATENT AND TRADEMARK OFFICE
CERTIFICATE OF CORRECTION

PATENT NO. : 4,624,506
DATED : November 25, 1986
INVENTOR(S) : Shigeaki Doto

It is certified that error appears in the above-identified patent and that said Letters Patent are hereby corrected as shown below:

Column 11, claim 1, line 17, delete "third-summing" and insert --third-second summing--

Signed and Sealed this

Fourteenth Day of April, 1987

*Attest:*

DONALD J. QUIGG

*Attesting Officer*   *Commissioner of Patents and Trademarks*